United States Patent [19]

Witten

[11] Patent Number: 5,082,405
[45] Date of Patent: Jan. 21, 1992

[54] POTTED INSERT FOR HONEYCOMB PANELS

[76] Inventor: Donald W. Witten, P.O. Box 508, Collinsville, Okla. 74021

[21] Appl. No.: 549,100

[22] Filed: Jul. 6, 1990

Related U.S. Application Data

[63] Continuation-in-part of Ser. No. 406,563, Sep. 13, 1989, Pat. No. 4,941,785.

[51] Int. Cl.⁵ .............................................. F16B 39/02
[52] U.S. Cl. ..................................... 411/82; 411/178; 411/258; 52/704
[58] Field of Search .......... 411/82, 258, 178, 180, 411/417, 418, 420, 421; 52/704, 707, 309.2, 125.5, 803, 825, 826

[56] References Cited

U.S. PATENT DOCUMENTS

| | | | |
|---|---|---|---|
| 2,949,054 | 8/1960 | White | 411/418 |
| 2,949,142 | 8/1960 | Sumerak | 411/180 |
| 3,417,803 | 12/1968 | Rohe et al. | 411/166 |
| 3,646,981 | 3/1972 | Barnes | 411/82 |
| 4,275,263 | 6/1981 | Chino | 411/178 X |
| 4,729,705 | 3/1988 | Higgins | 411/82 |
| 4,812,193 | 3/1989 | Gauron | 411/82 X |
| 4,818,165 | 4/1989 | Shirai | 411/178 |
| 4,941,785 | 7/1990 | Witten | 411/82 |

Primary Examiner—Rodney M. Lindsey
Assistant Examiner—Jerry Redman
Attorney, Agent, or Firm—Head & Johnson

[57] ABSTRACT

An insert for use of attachment in a threaded member, such as a bolt or the like, to a honeycomb panel by the use of epoxy adhesive, the insert being in the form of a unitary elongated metallic member having a generally cylindrical external surface and an integral annular enlarged external diameter collar portion at each end thereof, the external cylindrical surface having an integral externally extending spiraled thread portion extending from adjacent one collar portion to adjacent the other collar portion and the insert having an internal threaded recess therein, the external surface being configured to resist pull-out and torque-out when epoxy adhesive has solidified to retain the insert in a panel.

3 Claims, 3 Drawing Sheets

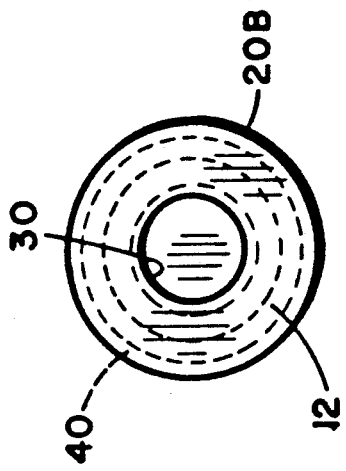
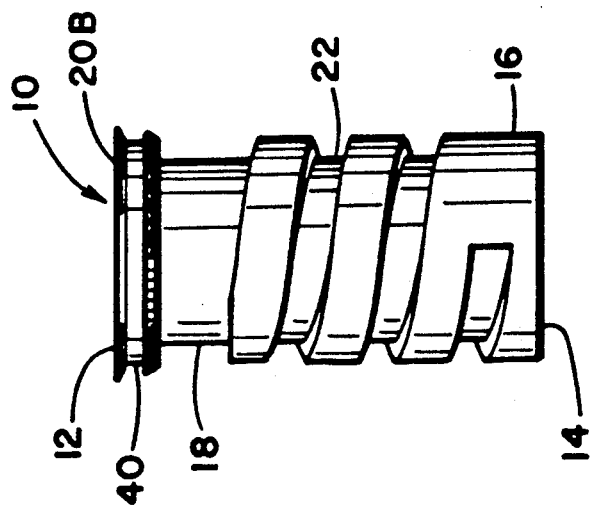
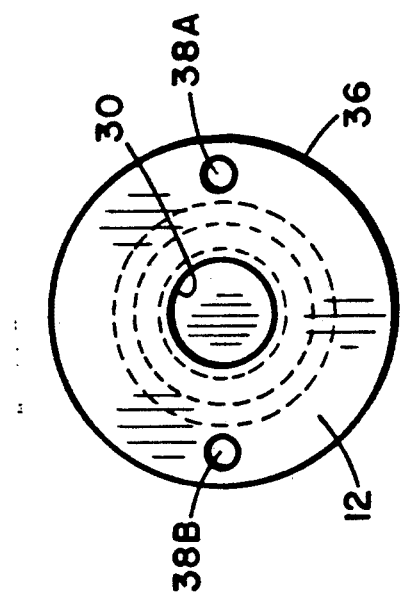
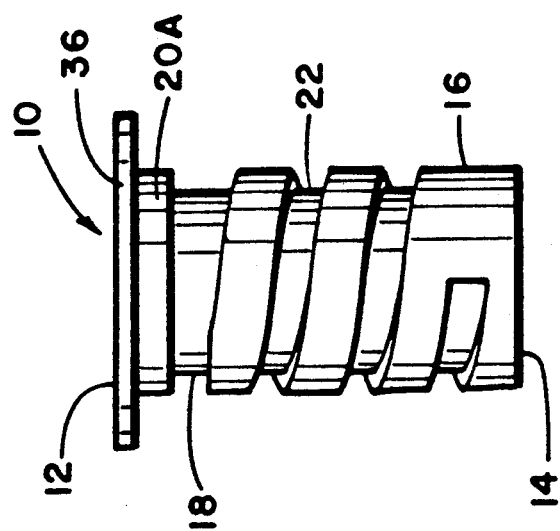
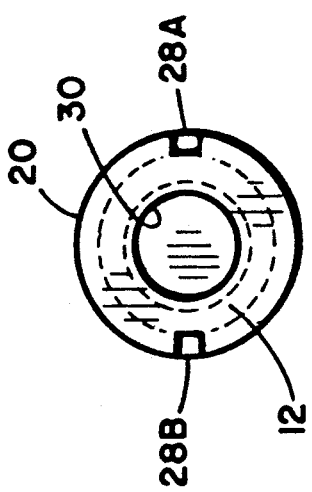
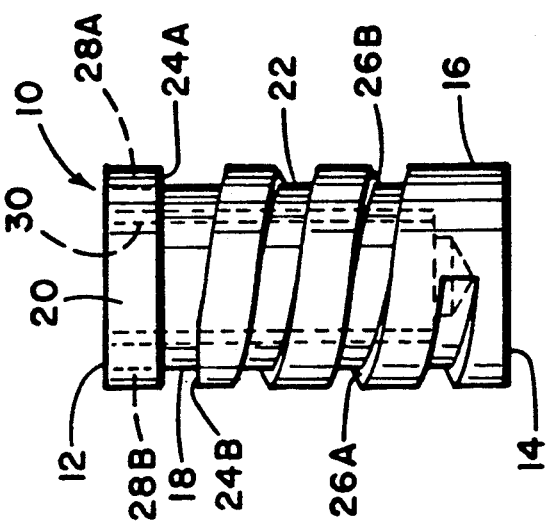

POTTED INSERT FOR HONEYCOMB PANELS

CROSS-REFERENCE

This is a continuation-in-part of application Ser. No. 07/406,563 filed 09/13/89, now U.S. Pat. No. 4,941,785, entitled "Potted Insert For Honeycomb Panels."

SUMMARY OF THE INVENTION

Honeycomb panels are frequently used for bulkheads, storage compartment flooring and other applications within the interior of the aircraft. Other applications for honeycomb panels are: aircraft flight control surfaces; transportable military shelters; various ground support equipment; and electronics cabinetry. Honeycomb panels are preferred because of their high strength to weight ratio and since they can be easily constructed to meet configurations required in the aircraft interior. One problem in connection with the use of honeycomb panels is that of attaching devices to them. Since the inner core of a honeycomb panel is generally composed of a cellular material with a great amount of open air spaces, a screw or bolt threaded into an opening in a panel does not obtain much pull-out resistance. For this reason, a standard technique for providing means for attachment of a threaded member, such as a bolt to a honeycomb panel, has employed the use of various types of inserts. For background material relating to inserts used in honeycomb panels, reference may be had to the following U.S. Pat. Nos. 3,271,498; 2,880,380; and 3,282,015. These patents are merely representative of devices used to provide means for attachment of a threaded member to a panel. In these prior issued patents, the typical panel to which they are applied are referred to as "Sandwich Panels", however, it is understood that by the term "sandwich" is meant panels of the type which include a honeycomb interior.

The insert as described in the present disclosure has advantages over those illustrated in these previously issued U.S. patents in that the insert herein described has a greater pull-out and torque-out resistance, and, therefore, provides increased resistance to failure.

The insert of this disclosure is in the form of an elongated metallic member having a generally cylindrical external surface. The member has an outer end and an inner end.

Formed as a part of the external cylindrical surface at the outer end is an integral annular collar portion. Adjacent the collar portion is a reduced external diameter circumferential recess which is contiguous to the collar portion.

Opposed notches are provided in the annular collar portion communicating the element outer end with the circumferential recess.

An internal threaded recess is formed in the element, the threaded recess being coaxial with the axis of the member cylindrical external surface and extending from the outer end to adjacent the inner end.

In a preferred arrangement of the invention, the spiral recess formed in the generally cylindrical external surface is defined by substantially paralleled opposed walls.

In a more preferred arrangement of the invention the insert is in the form of a unitary elongated metallic member having a generally cylindrical external surface and an outer end and an inner end, and having on the external cylindrical surface at the outer end a first integral, enlarged diameter annular collar portion and having at the inner end a second integral, enlarged diameter annular collar portion, and having on the external cylindrical surface an integral externally extending spiraled thread portion, the thread portion extending from adjacent the second collar portion to adjacent the first collar portion, and having in a plane of the cylindrical axis at least one notch formed in the second integral collar portion and the integral thread portion, and having a internally threaded recess therein coaxial with the member cylindrical external surface and extending from the outer end to adjacent the inner end.

A better understanding of the invention will be had by reference to the following description and claims, taken in conjunction with the attached drawings.

DESCRIPTION OF THE DRAWINGS

FIG. 1 is an external elevational view of one embodiment of the element of this disclosure.

FIG. 2 is an end view of the inner end of the element of FIG. 1.

FIG. 3 is an external elevational view of an alternate embodiment of the element of this disclosure.

FIG. 4 is an end view of the inner end of the element of FIG. 3.

FIG. 5 is a third embodiment of an element employing the principles of this invention.

FIG. 6 is an end view of the element of FIG. 5.

FIG. 11 is an elevational view as taken along the line 11—11 of FIG. 10.

DESCRIPTION OF THE PREFERRED EMBODIMENT

Figure 7:
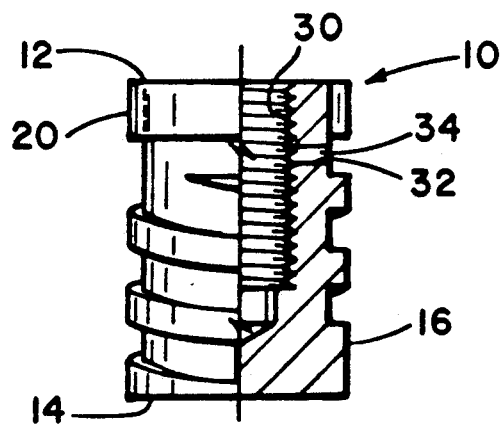
FIG. 7 is an elevational partial cross-sectional view of the element of FIG. 1, showing in more detail the internal threaded recess.

Referring to FIGS. 1, 2, 7 and 8, a first embodiment of the element of the invention is illustrated, the element being generally indicated by the numeral 10. The element 10 is a metallic member, such as formed of stainless steel, aluminum alloy, carbon steel, or the like. The member 10 has an inner end 12 and an outer end 14. The element 10 has a generally cylindrical surface 16.

A circumferential recess 18 is formed in the outer cylindrical surface 16 adjacent to and spaced from the inner end. This circumferential recess provides an integral annular collar portion 20.

The external cylindrical surface 16 is further defined by a spiraled groove 22 which extends from the circumferential recess 18 to adjacent the outer end 14. The spiral groove 22 and the annular recess 18 are both formed preferably with parallel sidewalls, that is, wherein the sidewalls 24A and 24B of the circumferential recess 18 are in plane perpendicular to the element cylindrical axis. In like manner, the spiral groove 22 is preferably formed, as illustrated, wherein the sidewalls 26A and 26B are parallel to each other.

The annular collar portion 20 is provided with opposed notches 28A and 28B.

Formed in the element and communicating with the inner end 12 is an internally threaded recess 30 which is adapted to receive a threaded bolt or other retention member.

As shown in FIG. 7, the element 10 includes a small diameter radial opening 32 communicating with the internal threaded recess 30 and the exterior of the element at the circumferential recess 18. Positioned in the radial opening 30 is a locking plug 34 formed of a tough plastic material. The locking plug 34 is pressed or molded into opening 32 so that the inner end thereof engages any threaded member (not shown) which is threaded into opening 30. Locking plug 34 serves to resist the inadvertent unthreading of any member threaded into the element, which is particularly important in aircrafts due to vibration.

FIGS. 3 and 4 show an alternate embodiment of the disclosure in which the annular collar portion 20A includes an integral, enlarged external diameter flange portion 36. The flange portion 36 includes opposed small diameter opening 38A and 38B therethrough.

FIGS. 5 and 6 show an additional alternate embodiment of the disclosure in which the circumferential flange is provided with a circumferential groove 40. In this embodiment, the diameter of the annular collar portion 20B is preferably slightly larger than the generally cylindrical surface 16.

Figure 8:
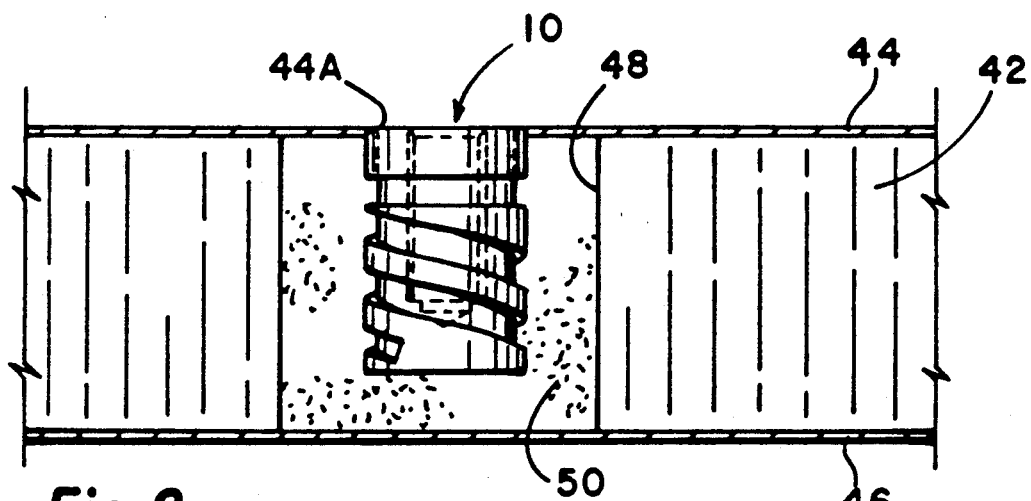
FIG. 8 is a partial cross-sectional view of a honeycomb panel having an element of the present disclosure retained within the panel as an illustration of the means of making use of the insert.

Referring to FIG. 8, the method of use of the insert is illustrated. A honeycomb panel 42 is formed of an inner cellular wall with a first outer skin 44 and an inner skin 46. In order to provide means for attachment of a threaded member, an opening 48 has been formed in the panel. The opening has been formed in the typical manner utilizing a hook routing tool, that is, an L-shaped tool (not shown). First, a hole of the required diameter, such as that slightly greater than the diameter of the external cylindrical surface 20 of the element, is formed in the outer skin 46. Then an L-shaped drilling tool is inserted into the panel past the outer skin 44 to drill the increased diameter hole 48.

To mount the element 10 in the panel, the opening 48 first receives a quantity of epoxy adhesive 50. The element 10 is then inserted through the opening 44A formed in the outer skin 40 so that the epoxy 50 completely fills the opening 48 between the inner skin 44 and the outer skin 46, and surrounds and contacts all external surfaces of the element 10. When the epoxy has hardened, the element is securely mounted within the panel 42 and can then receive threaded members, such as for mounting fire extinguishers, brackets, seat track, and so forth.

Figure 9:
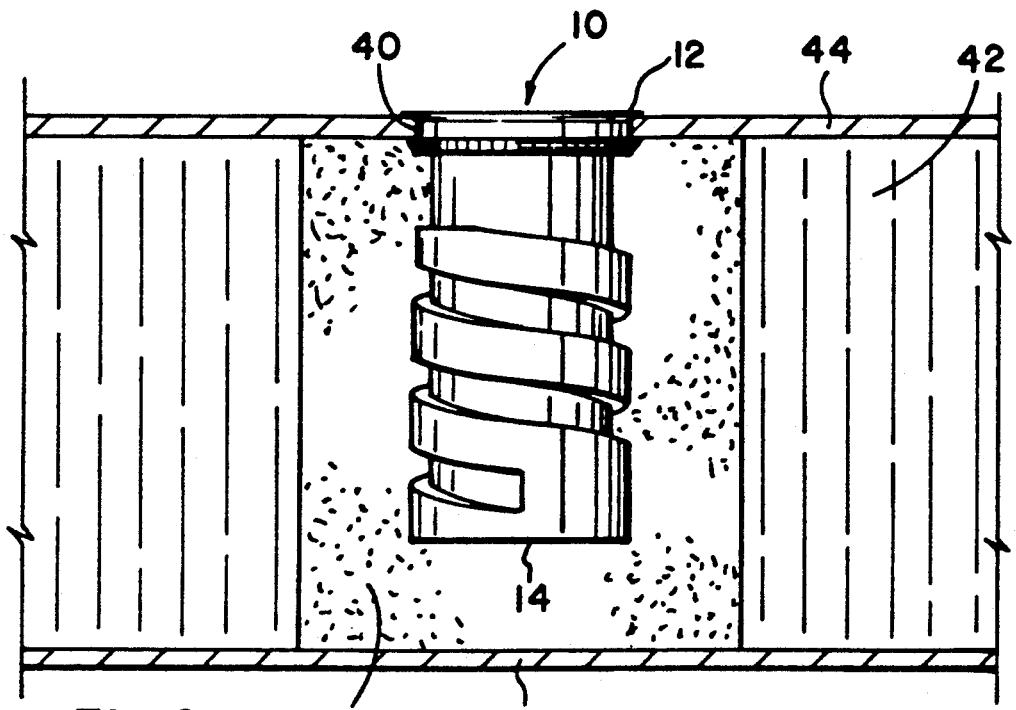
FIG. 9 is a partial cross-sectional view of a honeycomb panel having the element of FIGS. 5 and 6 retained within the panel.

FIG. 9 shows the use of the embodiment of FIGS. 5 and 6 wherein the panel outer skin 44 snaps into the element circumferential recess 40 to hold the element in place until the epoxy adhesive hardens.

The application of FIG. 3 is not illustrated, but it can be used in such a way that flange 38 is either flushed with the outer skin 44 or the flange 36 may extend externally of the panel, with the opening in the panel outer skin 44 being that which is sized to receive the annular collar portion 20A.

The notches 28A and 28B in the embodiment of FIG. 1, as shown best in FIG. 2, serve to permit the escape of excess epoxy adhesive when the element is inserted into position. This not only allows for the escape of excessive material but serves to demonstrate that sufficient epoxy adhesive has been employed so that full contact with all of the outer surface area of the element has been achieved. If additional epoxy material is required, it can be inserted through one of the notches 28A with the other notch 28B used to permit the escape of excessive material and to demonstrate that the opening in the panel has been completely filled with epoxy adhesive.

With reference to FIG. 4, the small diameter openings 38A and 38B serve the same purpose as has been described with respect to notches 28A and 28B.

Figure 10:
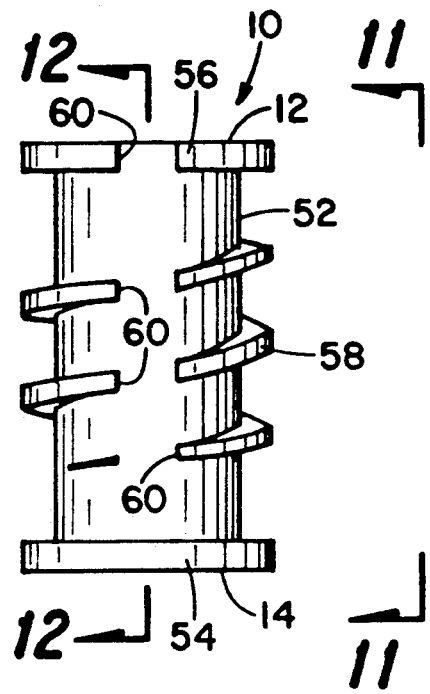
FIG. 10 is an elevational view of an alternate embodiment of the insert for use in the attachment of a threaded member to a panel.
Figure 11:
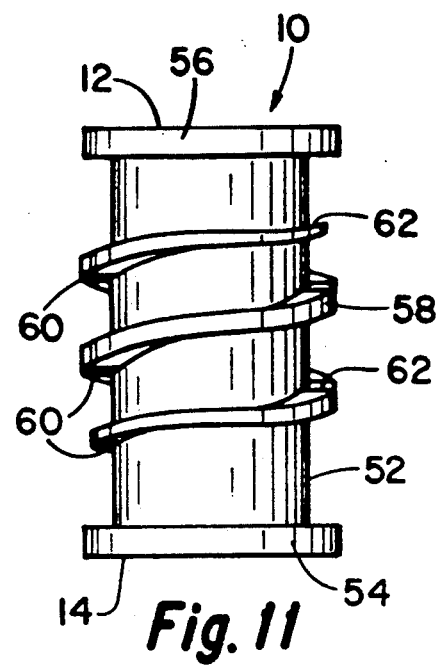
FIG. 11 is an elevational view as in FIG. 10 but with the member rotated 90 degrees.
Figure 12:
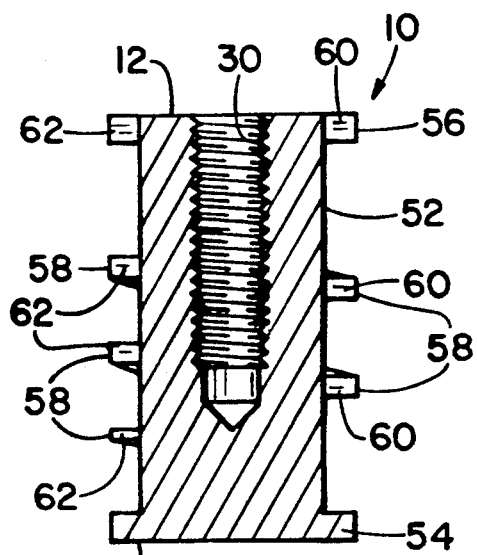
FIG. 12 is an elevational cross-sectional view as taken along the line 12—12 of FIG. 10.

Referring to FIGS. 10, 11 and 12, a further improved and most preferred embodiment of the invention is illustrated. The element 10 is similar in most respects to that described with reference to FIGS. 1-9 and has an inner end 12 and an outer end 14. In the embodiment of FIGS. 10-12 the element has a cylindrical external surface 52. Integrally formed at the outer end 14 is a first integral enlarged diameter annual collar portion 54. In like manner, integrally formed with the element at the inner end 12 is a second enlarged diameter annular collar portion 56.

Formed on the element external cylindrical surface 52 is an integral externally extending spiral thread portion 58. The spiral thread portion extends from adjacent the first annular collar portion 54 to adjacent the second annular portion 56. Uninterrupted space is provided on the element external cylindrical surface 52 between the beginning of thread portion 58 and collar 54 and between the end of the spiral thread portion 58 and collar 56.

The element has, in a plane of the cylindrical axis, opposed longitudinal notches 60 and 62 extending through the second annular collar portion 56 and through the spiral threads 58, but not through the first collar portion 54. The notches 60 and 62 interrupt the spiral thread portion 58 on opposed sides of the element cylindrical wall 52 and form opposed notches in the second collar portion 56. Notches 60 and 62 provides passageways for the potting material to pass the full length of the element. After the potting solidifies the solid potting functions like a keyway to lock the element against rotation in either direction.

The improved embodiment of the invention shown in FIGS. 10, 11 and 12 function in the same way as described with reference to the early described embodiments. The notches 60 and 62 in the collar portion 56 provide access for the insert of potted material to surround the element after it is fitted in an opening in a panel.

As shown in FIG. 12 the element has an internally threaded recess 30, as described with reference to FIG. 7, to receive a bolt after the element is potted into a panel.

The improved embodiment of FIGS. 10-12 provides superior holding means in that the integral enlarged external diameter collar portion 54 combined with other features of the insert resists pulling of the element from a panel after it is potted in the panel.

The embodiment of FIGS. 10, 11 and 12 may be employed with a circumferential groove 40 a shown in FIGS. 5, 6 and 9. This arrangement is advantageous in that the element can be snapped into an opening in a panel outer skin to thereby retain the element securely in place as the epoxy solidifies.

The insert as described provides an improved element for use in conjunction with honeycomb panels.

The device is easy to use and does not include irregularities on the external surface which may escape contact with the epoxy adhesive and which provides square shouldered surfaces to resist pull-out and torque-out of the insert after the epoxy adhesive has hardened. Increased pull-out and torque-out strength is obtained by the designs of this disclosure since the spiral thread portion provides increased surface contact area which resists shear of the epoxy embedded between the threads when a load is applied. This increase resistance applies to both conditions, that is, straight pull and torque-out or a combination of both.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An insert for use in attachment of a threaded member, such as a bolt or the like, to a panel, such as a honeycomb panel, such as by use of an epoxy adhesive, the insert comprising:

a unitary elongated metallic member having a generally cylindrical external surface and an outer end and an inner end, and having on the external cylindrical surface at said outer end a first integral, enlarged diameter annular collar portion and having at said inner end a second integral enlarged diameter annular collar portion, and having on the external cylindrical surface an integral externally extending spiraled thread portion, the thread portion extending from adjacent said second collar portion to adjacent said first collar portion, and having in a plane of the cylindrical axis at least one notch formed in said second integral collar portion and aligned notches formed in said integral thread portion, each notch being of relatively narrow width and having substantially parallel side walls and extending in depth to at least substantially said cylindrical external surface, and having an internally threaded recess therein coaxial with said member cylindrical external surface and extending from said inner end to adjacent said outer end.

2. An insert according to claim 1 wherein said member has, in said plane of the cylindrical axis opposed notches formed in said second integral collar portion and said integral threaded portion.

3. An insert according to claim 1 wherein said integral externally extending spiraled thread portion is defined by substantially paralleled opposed walls.

* * * * *